(12) United States Patent
Settelmayer et al.

(10) Patent No.: US 8,074,851 B2
(45) Date of Patent: *Dec. 13, 2011

(54) CAR TOP CARRIER

(75) Inventors: Joseph J. Settelmayer, Fieldbrook, CA (US); Scott R. Allen, Fieldbrook, CA (US); Timothy C. Smith, McKinleyville, CA (US)

(73) Assignee: Yakima Products, Inc., Beaverton, OR (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/215,113

(22) Filed: Jun. 24, 2008

(65) Prior Publication Data

US 2009/0014489 A1 Jan. 15, 2009

Related U.S. Application Data

(60) Continuation of application No. 11/219,578, filed on Sep. 2, 2005, now Pat. No. 7,416,098, which is a division of application No. 10/767,398, filed on Jan. 28, 2004, now Pat. No. 7,503,470.

(60) Provisional application No. 60/443,437, filed on Jan. 28, 2003.

(51) Int. Cl.
| | |
|---|---|
| B60R 9/00 | (2006.01) |
| B60R 9/048 | (2006.01) |
| B60R 9/058 | (2006.01) |
| B62J 9/00 | (2006.01) |
| A47B 96/06 | (2006.01) |
| E04G 3/00 | (2006.01) |

(52) U.S. Cl. ........ 224/319; 224/309; 224/323; 224/324; 224/329; 224/515; 224/536; 224/558; 224/448; 248/229.13; 248/228.4; 248/228.6

(58) Field of Classification Search ............ 224/319, 224/536, 328, 42.4, 405, 404, 309, 515, 558, 224/323, 324, 329, 401, 448, 456, 461; 410/77, 410/80; 248/691, 97, 229.13, 228.4, 228.6
See application file for complete search history.

(56) References Cited

U.S. PATENT DOCUMENTS

| | | | | |
|---|---|---|---|---|
| 1,313,687 | A | | 8/1919 | Hellweg |
| 2,483,947 | A | | 10/1949 | Turner |
| 3,008,177 | A | * | 11/1961 | Wooten, Jr. ............... 16/224 |
| 3,366,295 | A | | 1/1968 | Nygaard |
| 3,677,196 | A | | 7/1972 | Schuller |
| 4,217,999 | A | * | 8/1980 | Forsman .................. 224/319 |
| 4,249,684 | A | * | 2/1981 | Miller et al. .............. 224/42.4 |
| 4,274,568 | A | | 6/1981 | Bott |
| 4,378,898 | A | * | 4/1983 | Smeenge et al. ............. 224/328 |
| 4,406,387 | A | * | 9/1983 | Rasor ...................... 224/328 |
| 4,420,105 | A | | 12/1983 | Nepper |
| 5,280,848 | A | | 1/1994 | Moore |
| 5,419,479 | A | | 5/1995 | Evels et al. |
| 5,492,258 | A | * | 2/1996 | Brunner ................... 224/321 |
| 5,546,705 | A | * | 8/1996 | Hirtsiefer ................. 49/386 |
| 5,582,313 | A | | 12/1996 | Envall |

(Continued)

FOREIGN PATENT DOCUMENTS

DE 2804588 8/1979

(Continued)

Primary Examiner — Justin Larson
Assistant Examiner — Lester L Vanterpool
(74) Attorney, Agent, or Firm — Kolisch Hartwell, P.C.

(57) ABSTRACT

The invention provides improvements for an enclosed carrier configured for mounting on top of a car.

7 Claims, 8 Drawing Sheets

U.S. PATENT DOCUMENTS

| | | | |
|---|---|---|---|
| 5,582,316 A | 12/1996 | Masayoshi et al. | |
| 5,762,244 A * | 6/1998 | Wagner et al. | 224/281 |
| 5,823,411 A * | 10/1998 | Gronwoldt et al. | 224/328 |
| 5,845,828 A | 12/1998 | Settelmayer | |
| 5,947,356 A * | 9/1999 | Delong | 224/404 |
| 6,145,719 A * | 11/2000 | Robert | 224/401 |
| 6,273,311 B1 * | 8/2001 | Pedrini | 224/321 |
| 6,296,161 B1 * | 10/2001 | Van der Feen et al. | 224/319 |
| 6,296,278 B1 | 10/2001 | Zupancic et al. | |
| 6,463,627 B1 | 10/2002 | Hirtsiefer | |
| 6,681,971 B2 | 1/2004 | Laverack et al. | |
| 6,789,357 B1 | 9/2004 | McCullough | |
| 6,918,521 B2 | 7/2005 | Settelmayer et al. | |
| 7,416,098 B2 | 8/2008 | Settelmayer et al. | |
| 2002/0030074 A1 | 3/2002 | Bove et al. | |
| 2004/0155081 A1 | 8/2004 | Settelmayer et al. | |
| 2004/0256427 A1 | 12/2004 | Settelmayer et al. | |
| 2005/0145639 A1 | 7/2005 | Viklund et al. | |
| 2006/0032878 A1 | 2/2006 | Settelmayer et al. | |

FOREIGN PATENT DOCUMENTS

| | | | |
|---|---|---|---|
| DE | 3817470 | | 11/1989 |
| DE | 3837209 | | 3/1990 |
| DE | 4340019 | | 4/1995 |
| DE | 19526477 | | 9/1996 |
| DE | 19526477 | C1 * | 9/1996 |
| DE | 19742253 | | 5/1999 |
| DE | 19742253 | C1 * | 5/1999 |
| EP | 0422678 | | 4/1991 |
| EP | 0754595 | | 1/1997 |
| EP | 0983903 | | 3/2000 |
| EP | 1190906 | | 3/2002 |
| EP | 1231112 | | 8/2002 |
| EP | 1231112 | A2 * | 8/2002 |
| EP | 1284218 | | 2/2003 |
| FR | 2840571 | | 7/2005 |
| JP | 07172452 | A * | 9/1994 |
| JP | 7172452 | | 7/1995 |
| JP | 8258630 | | 10/1996 |
| JP | 08258630 | A * | 10/1996 |
| JP | 11291832 | A * | 4/1998 |
| JP | 11291832 | | 10/1999 |
| SU | 1770175 | | 10/1992 |
| WO | 9711865 | | 4/1997 |

* cited by examiner

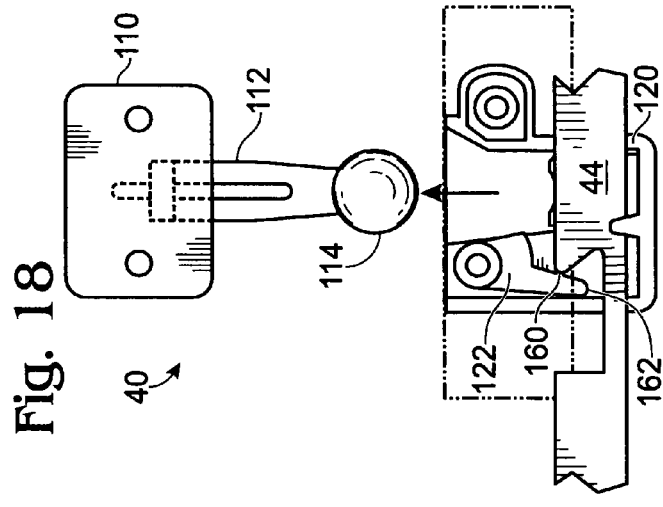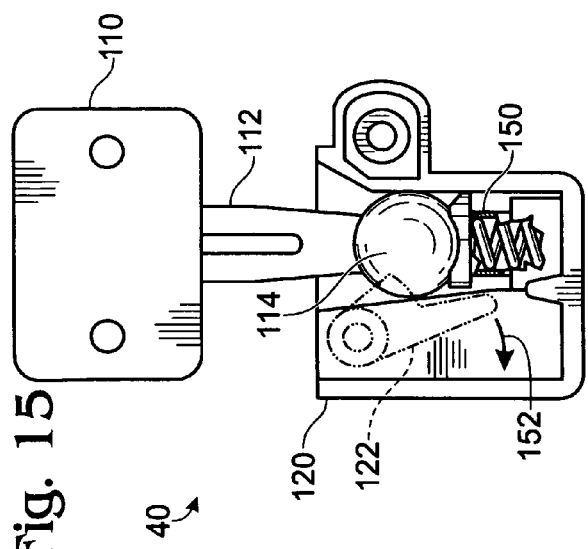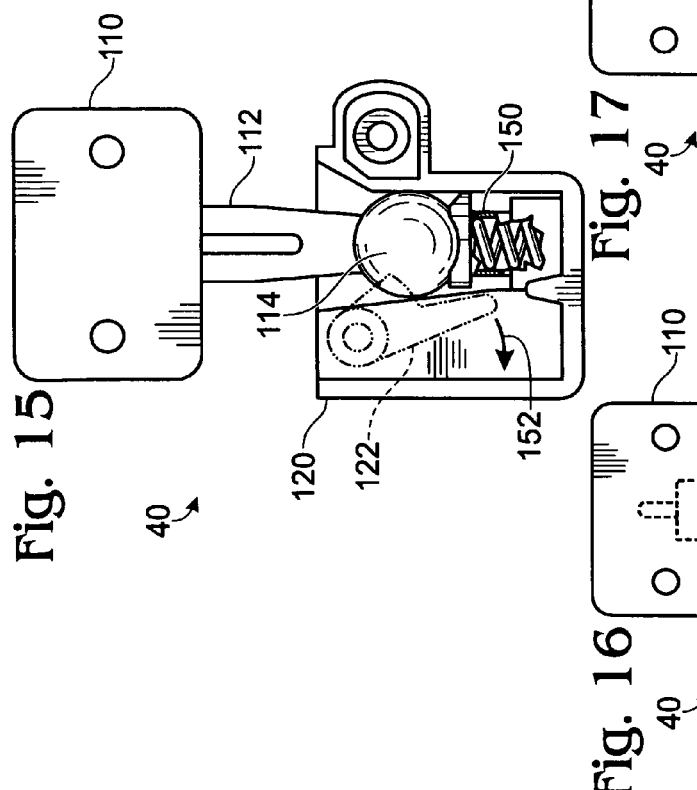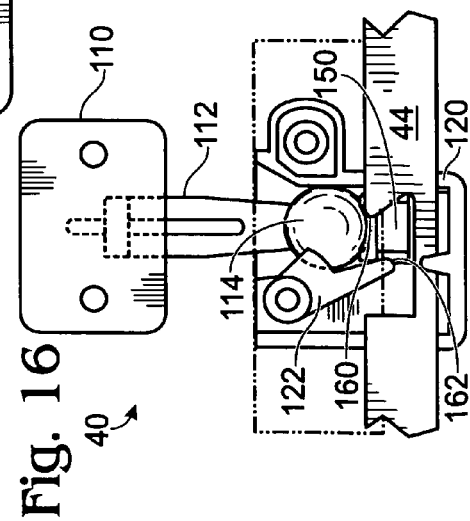

CAR TOP CARRIER

CROSS-REFERENCE TO RELATED APPLICATION

This application is a continuation of U.S. patent application Ser. No. 11/219,578 filed Sep. 2, 2005 now U.S. Pat. No. 7,416,098 which is a divisional application of U.S. patent application Ser. No. 10/767,398 filed Jan. 28, 2004 now U.S. Pat. No. 7,503,470 which is based upon and claims priority under 35 U.S.C. §119 from U.S. Provisional Patent Application Ser. No. 60/443,437 filed Jan. 28, 2003 and from U.S. patent application Ser. No. 10/662,123 filed Sep. 11, 2003, all of which is incorporated herein by reference in its entirety for all purposes.

FIELD OF THE INVENTION

The invention relates to assemblies for carrying cargo on a vehicle. In particular, the invention provides improvements for a box or trunk designed for mounting on top of a car.

BACKGROUND OF THE INVENTION

In recent years car top carriers in the form of boxes or trunks have become quite popular. Enclosed carriers are preferable over conventional open racks for a variety of reasons. Enclosed carriers protect cargo from the elements such as wind, rain, and snow. Enclosed carriers are also more secure from theft or vandalism.

However, some car top boxes have problems which make them difficult or cumbersome to use. For example, some boxes use a labor intensive bracket system to secure the box on to the crossbars of a vehicle roof rack. Bracket systems typically require the installer to reach extensively over the top of the car. Such bracket systems are impractical, particularly for a short person. The installer may have to practically climb into the open box to secure the brackets. This is especially a problem for a user who frequently wants to install or remove the carrier from the car.

Another problem with some enclosed car top carriers is that they can only be accessed from one side. Depending on where or how the vehicle is parked, or who is trying to access the carrier, it may be inconvenient or awkward to always access the box from the same side.

Another problem with car top trunks or boxes is that they are sometimes difficult to open. Typically, there are several latches on the side of the box that opens. The user may have to operate multiple latches simultaneously where the latches are separated by a long distance. This may require substantial strength, dexterity, and reach. Some boxes have an actuator that coordinates simultaneous release of multiple latches but still may require special handling such as lifting of the cover while manipulating the actuator or handle. Accordingly, there is a need for enclosed car top carriers that are easy to mount on a vehicle and easy to use.

SUMMARY OF THE INVENTION

An example of the invention uses a mounting assembly that is quick and easy to install on a car. A preferred design uses a cam-operated clamping device to grip crossbars on a vehicle rack. Another example of the invention uses coordinated hinge/latch devices to permit easy opening of the carrier from either side of a vehicle. Other examples and aspects of the invention are described in detail below.

BRIEF DESCRIPTION OF DRAWINGS

FIG. 15 is a partial cut way view of a hinge/latch mechanism, for example, as shown in FIG. 2.
FIGS. 16-18 are partial cut away views of a hinge/latch mechanism in operation.

DESCRIPTION OF THE INVENTION

Figure 1:
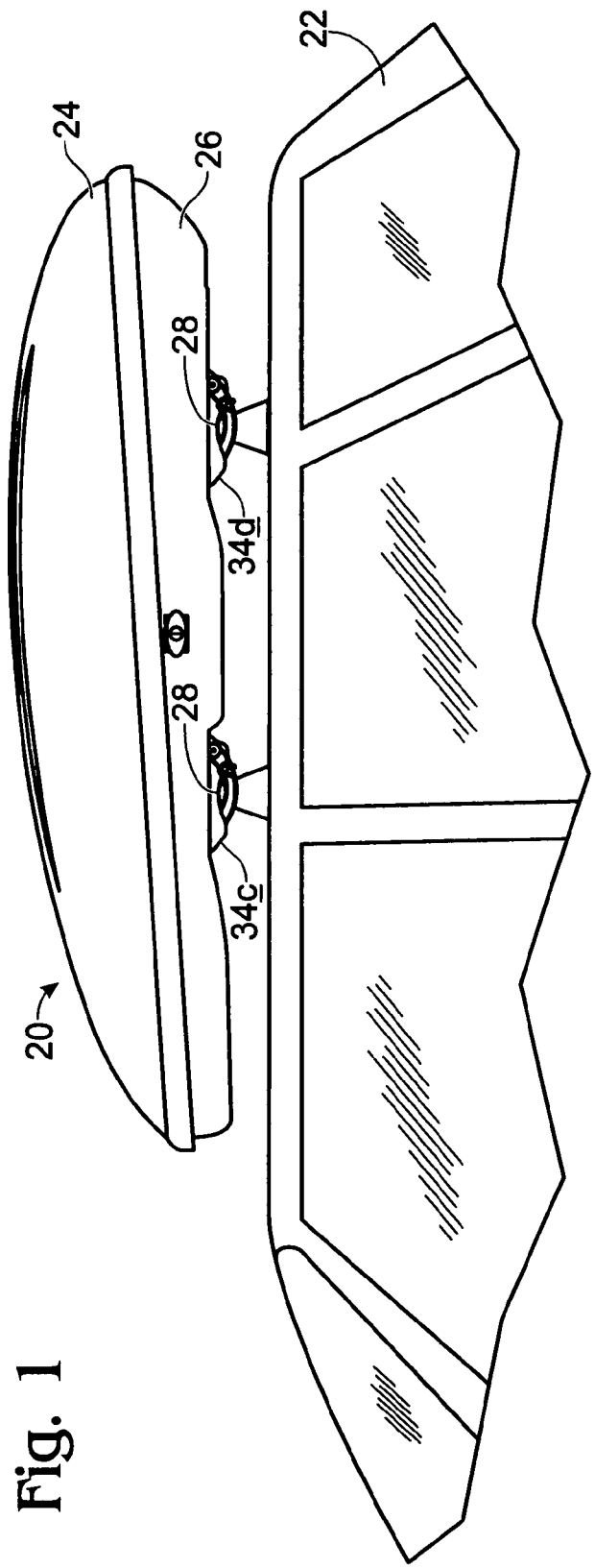
FIG. 1 is a side view of a car top carrier mounted on a vehicle.

FIG. 1 shows car top carrier 20 mounted on vehicle 22. Car top carrier 20 includes top 24 and bottom 26 mounted on crossbars 28 on the top of car 22.

Figure 2:
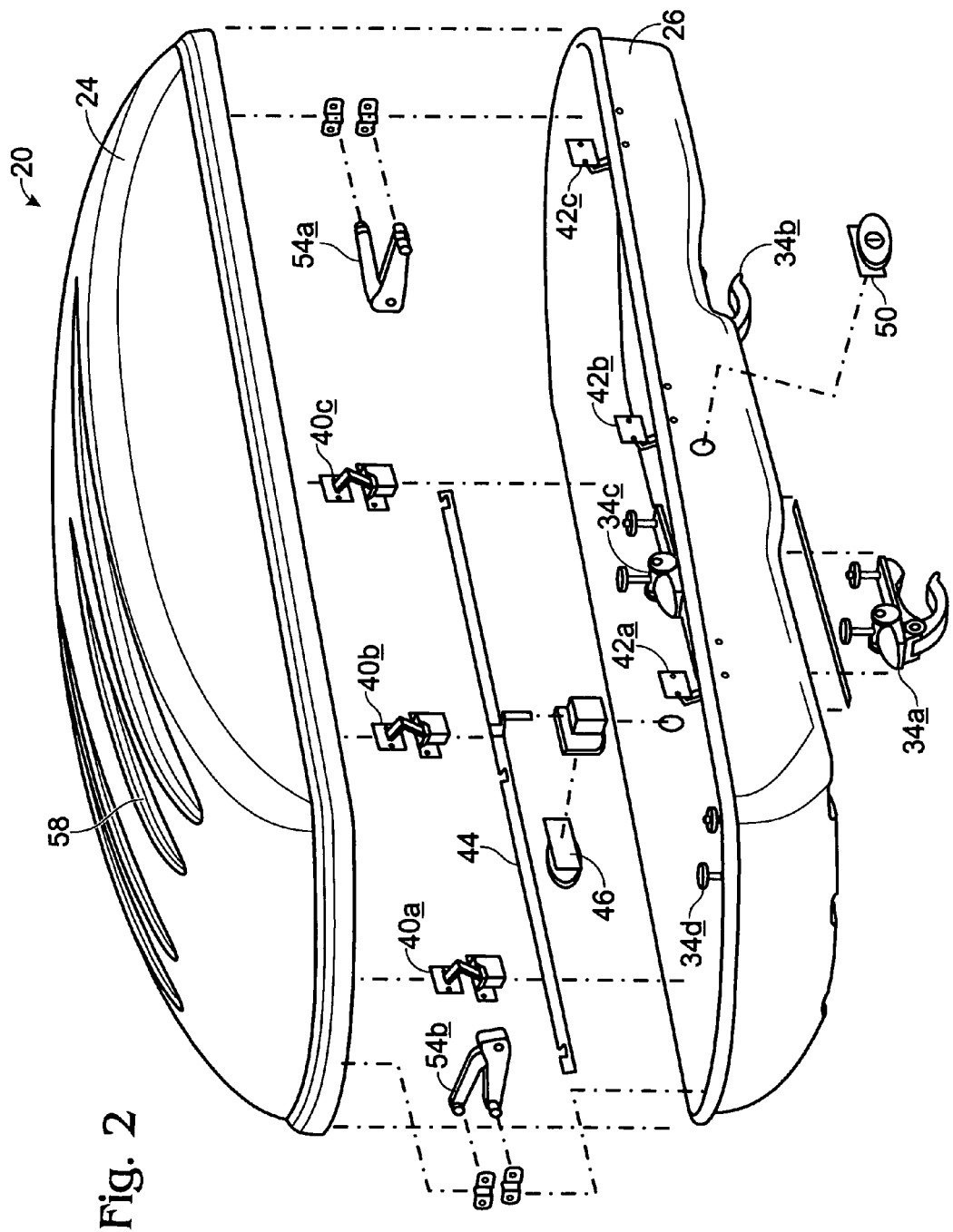
FIG. 2 is an exploded view of a car top carrier.

FIG. 2 shows an exploded view of car top carrier or box 20. Mounting hardware is provided for easily securing carrier 20 to the vehicle rack. For example, four mounting mechanisms 34a-d may be provided for this purpose. Each mounting mechanism includes a cam lever for operating a jaw mechanism to clamp around a crossbar, as explained in more detail below. The clamps may be provided completely preassembled with the box. The clamps never need to be disassembled as the carrier is put on and off one or more cars through the life of the product. Each clamp may be adjustable to grip, with variable force, crossbars of different dimensions. The clamps may also be adjustable to different locations on the floor of the box, for example, along an axis parallel to the direction of vehicle travel. The clamps are preferably configured so that once the carrier clamps are adjusted for a particular vehicle configuration, the carrier can be easily installed or removed by simply manipulating each cam lever with a single, one step, switch, toggle, rotation, stroke or other quick-action, for example, with an over-center assist mechanism.

Sets of hinge/latch mechanisms may also be provided on each side of carrier 20 to allow opening of the carrier from opposite sides. In FIG. 2, hinge/latch mechanisms 40a-40c are mounted on one side of carrier 20 to connect top 24 to bottom 26. Similarly, on the other side of carrier 20, hinge/latch mechanisms 42a-42c connect top 24 to bottom 26. Actuating bar 44 is mounted inside carrier 20 for operating and synchronizing hinge/latch function of mechanisms 40a-40c. Actuating bar 44 may be operated, i.e., moved forward and backward relative to the long axis of carrier 20, by manipulating switch, handle, or key device 46 from the exterior of carrier 20. A similar actuating bar (not shown) is used to operate hinge/latch mechanisms 42a-c via switch, handle, or key device 50.

Lid supports 54a and 54b are mounted at the front and back ends of carrier 20, connecting top 24 to bottom 26. Lid supports 54a and 54b stabilize top 24 when moving between open and closed positions. Lid supports 54a and 54b may also limit the extent of potential opening of carrier 20. For example, lid supports 54a, 54b, may limit the extent of opening on either side of carrier 20 to approximately 16-inches. Longitudinal ribs or indentations 58 may be formed in carrier top 24 to provide stiffening and increased strength for carrier 20, and may also be desirable aesthetically.

Figure 3:
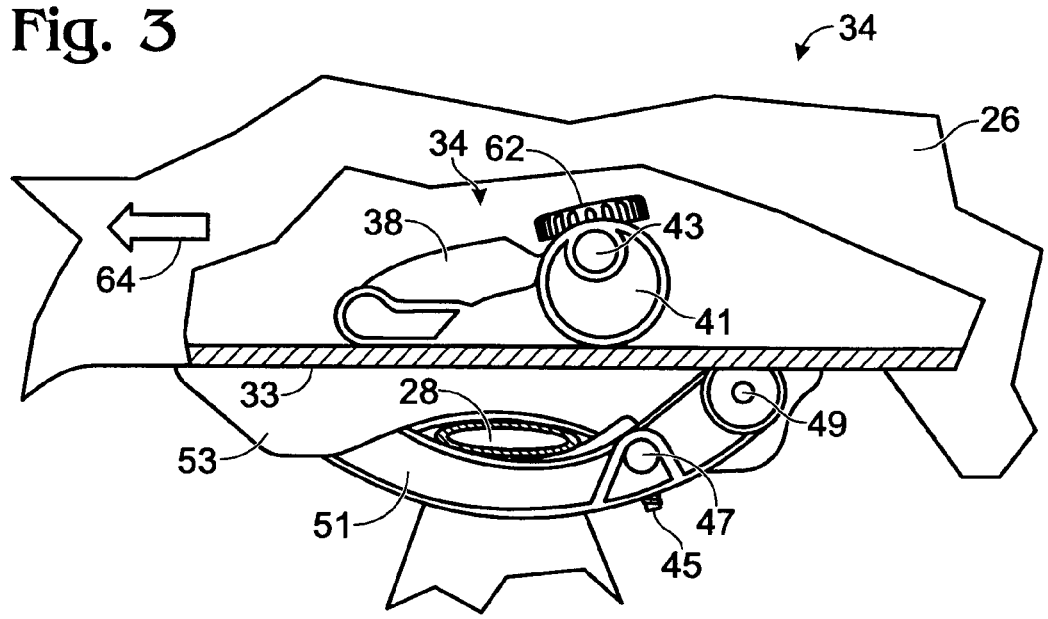
FIG. 3 is a partial cut-away view of clamp 34c in FIG. 1 gripping a crossbar.

FIGS. 3-7 show details of one of the four mounting mechanisms, for example, as shown in FIG. 2. FIG. 3 is a side view of one of clamps 34, with a portion of bottom 26 of carrier 20 cut-away. In closed position, cam lever 38 seats against floor 33 of bottom 26. Cam lever 38 acts through cam portion 41, shaft member 43, bolt 45, barrel nut 47, and axle 49 to apply a force holding crossbar 28 tightly clamped between movable jaw portion 51 and stationary jaw portion 53.

Figure 4:
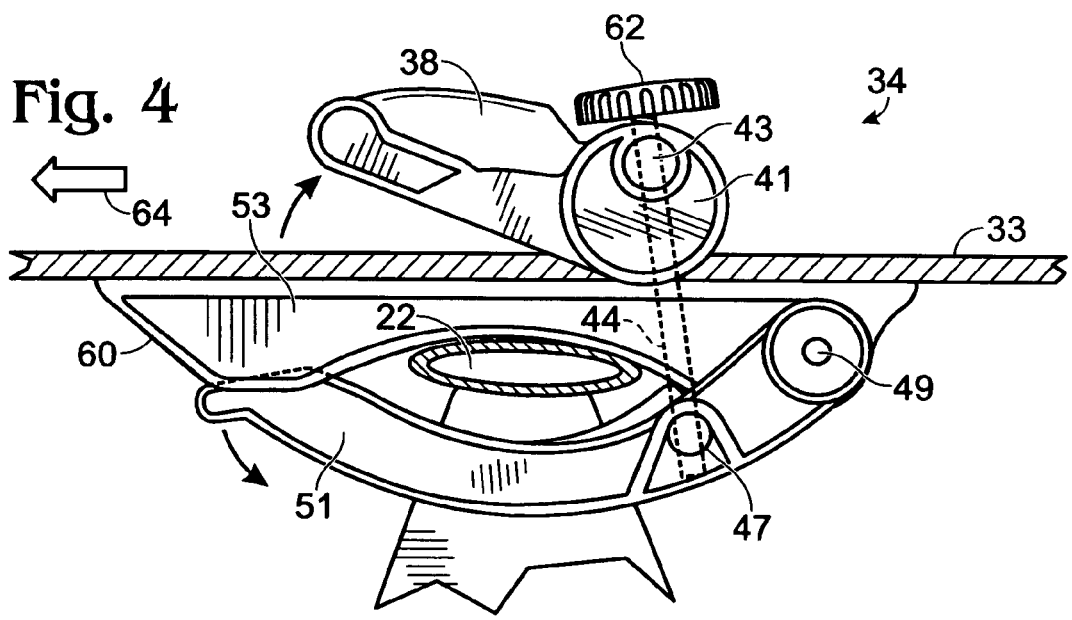
FIGS. 4 and 5 are partial cut-away side views of the clamp in FIG. 3 as the cam lever moves toward the release position.
Figure 5:
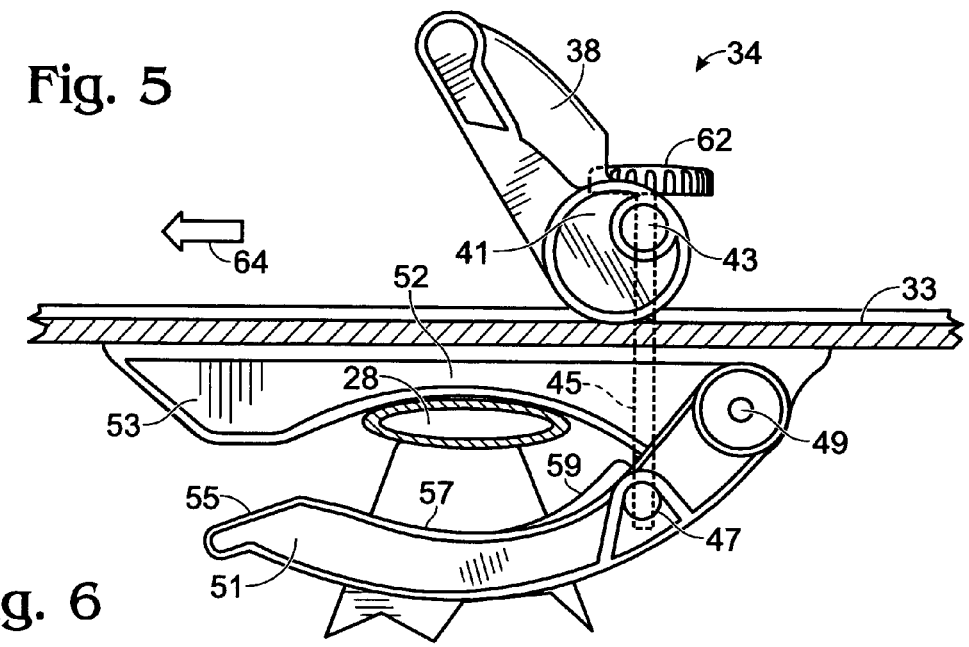

FIGS. 4 and 5 show details of clamp 34 moving to an unclamped position. Cam lever 38 pivots around shaft member 43. The shape of cam portion 41 and the position of shaft member 43 causes opening and closing of movable jaw portion 51 relative to stationary jaw portion 53 when cam lever 38 is rotated between different positions as shown in FIGS. 3 to 5. The jaw portions may define openings of different shapes for various purposes. The jaw portions in FIGS. 3-5 define an elongate curved opening, or oval shape to accommodate crossbars having different cross-sectional shapes. Cam portion 41 is shaped so that as lever 38 rotates around shaft member 43 the distance between shaft member 43 and floor 33 is altered, thus causing corresponding pivotal movement of jaw portion 51 toward or away from fixed stationary jaw portion 53 mounted on floor 33. An over-center mechanism is used so that a maximum height of shaft member 43 is reached at an intermediate point, for example, approximately at the location shown in FIG. 4. This way lever 38 tends to stay locked in the closed position shown in FIG. 3, and tends to spring to the unlocked position when lever 38 is moved over-center in the opposite direction, as shown in FIG. 5. Movable jaw portion 51 pivots around axle structure 49. Movable jaw portion 51 is elongate, with an initial portion 55 angled so as to guide crossbar 28 into position between movable jaw portion 51 and stationary jaw portion 53. Movable jaw portion 51 has a concave inner surface 57 which contacts crossbar 28 when the jaw is closed, and which is configured for gripping. Concave inner surface 57 may have a cushion or pad 59 near axle 49. Stationary jaw portion 53 may have side tabs 61 to guide movable jaw portion 51 when clamp 34 is moved to the closed position.

Clamp 34 is mounted on floor 33 of carrier bottom 26 by bolt 45, with barrel nut 47 serving us an anchor pivot for bolt 45. In addition, a first oversize knob 63 turns bolt 45 to move barrel nut 47 closer to or farther away from shaft member 43, thereby providing a gross adjustment mechanism for the tightness of the clamping action. Movable jaw portion 51 clamps around crossbar 28. In FIGS. 3-5, arrow 64 indicates the direction of forward travel of vehicle 26. Movable jaw portion 51 preferably is oriented to open in the forward direction to make carrier 20 less likely to be dislodged from vehicle 22 in a high-impact forward collision.

Figure 6:
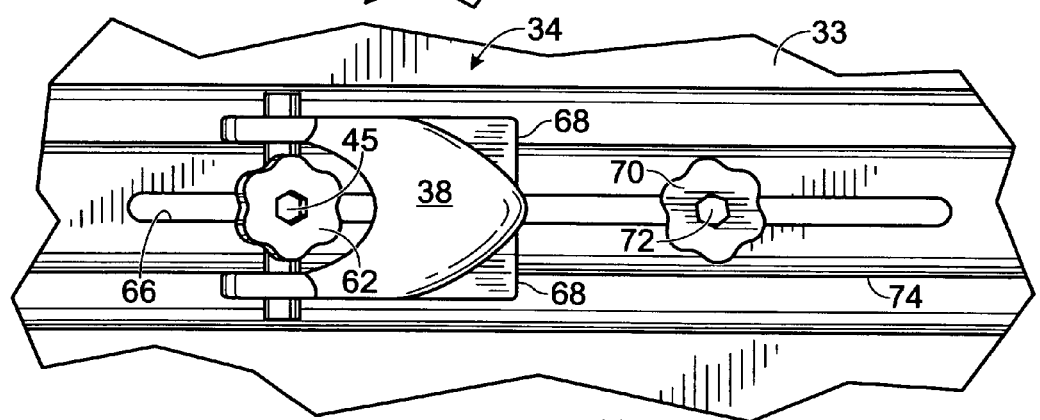
FIG. 6 is a top view of the clamp in FIG. 3.

FIG. 6 shows a top view of clamp 34. Bolt 45 passes from the inside of car top carrier 20 to the outside through floor 33 of carrier bottom 26 via slot 66 which is aligned with the long axis of car top carrier 20. Slot 66 allows adjustment of the location of clamp 34 along the long axis of car top carrier 20. Finger tabs 68 facilitate prying or lifting of cam lever 38 away from floor 33 when opening clamp 34. Cam lever 38 is shaped to provide clearance for first oversize knob 62 when cam lever 38 is moved between open and closed positions. A second oversize knob 70 provides for tightening or loosening of fastener 72 passing through slot 66 to stationary jaw component 53 to prevent or allow motion of clamp 34 in slot 66. Floor 33 of bottom 30 is shaped in the form of a ridge or rail 74 to complement the shape of clamp 34 and to aid in seating cam lever 38 against floor 33 when clamp 34 is in the closed position, thereby providing repeatable and secure alignment.

Figure 7:
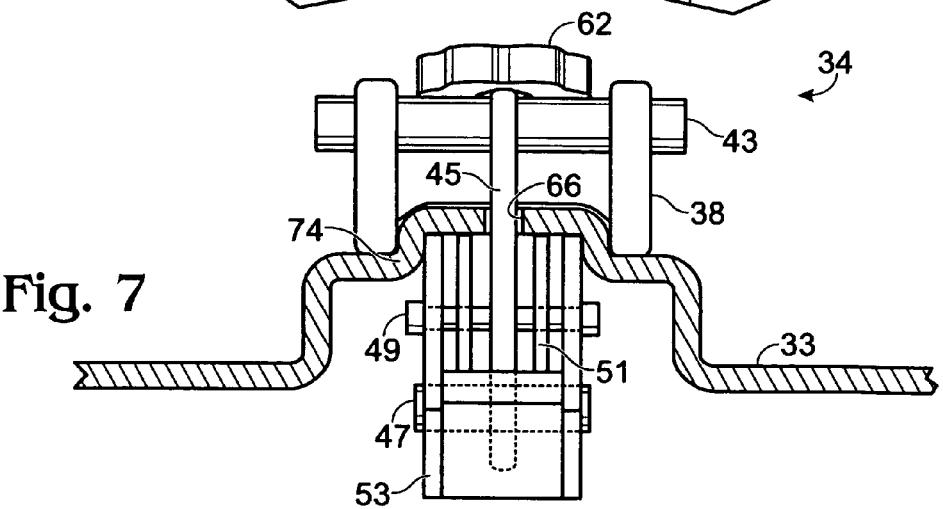
FIG. 7 is an end-on view of the clamp in FIG. 3.

FIG. 7 is an end-on view of clamp 34, as shown in FIG. 6. Shaft member 43 may include curvature away from barrel nut 47 so as to provide spring action during operation of clamp 34.

Figure 8:
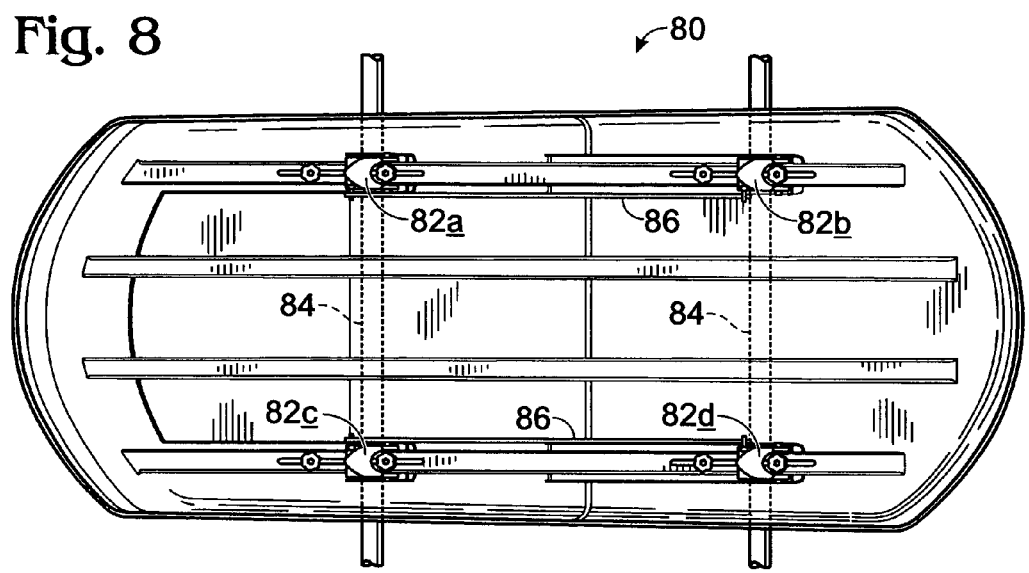
FIG. 8 is an inside view of a car top carrier with four clamps ganged together.

FIG. 8 shows a top view of the interior of car top carrier 80 including four clamps 82a-d. In this example, all four clamps 82a-d are ganged by connectors 84 and 86. Ganging clamps allows multiple clamps to be operated with a single movement, step, or manipulation. Ganged clamp configurations may also make it easier to operate clamps located distally from the installer's vantage point.

Figure 9:
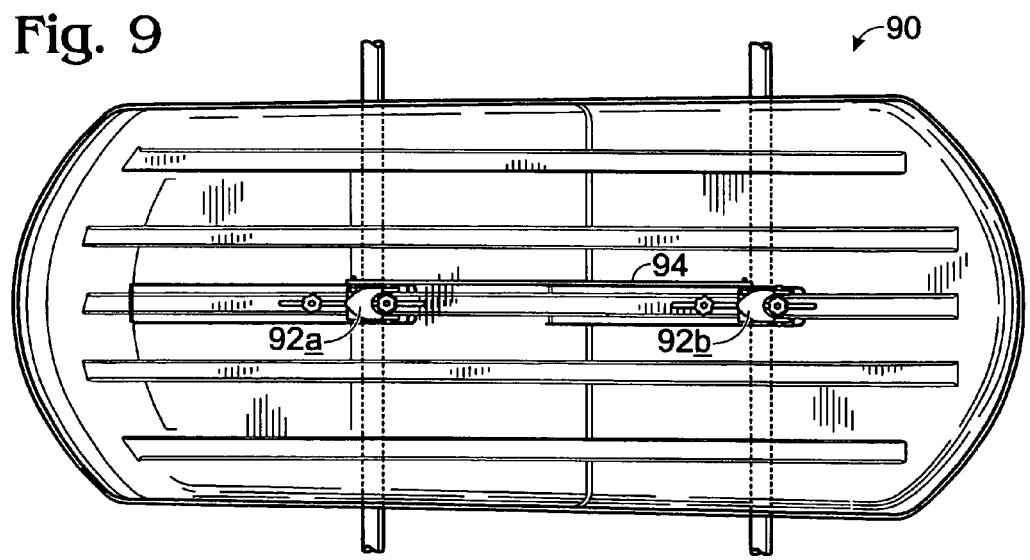
FIG. 9 is an inside view of a car top carrier with two clamps ganged together.

FIG. 9 shows another example. A top view of car top carrier 90 has two clamps 92a and 92b. In this example, two clamps 92a and 92b are located on front and rear crossbars, and are ganged by connector 94 so that clamps 92a and 92b open and close together.

Any number of clamps may be used to fasten a container on a set of crossbars on top of a vehicle. For example, one, two or more clamps may be used to secure a container on a front crossbar. Similarly, one, two or more clamps may be used to secure a container to a rear crossbar. For some purposes a single clamp may be sufficient, for example, on the front crossbar with the container merely resting on the back crossbar. In other instances, a single clamp may be used on each crossbar, or multiple clamps may be used on one or both crossbars.

Any combination of clamps may be ganged. For example, it may be advantageous to have a clamp which is closest to the hinge side of a box (distal clamp) ganged to a clamp on the opening side of the box (proximal clamp) so that operation of the proximal clamp automatically operates a corresponding distal clamp.

It may also be advantageous to have an extended handle or actuator connected to the distal clamp so that the distal clamp can be operated with minimal reaching from the open side of the container.

A clamp, as described above, may also be modified to provide automatic clamping. For example, the movable jaw portion may be spring biased toward the closed position. The lip of the jaw may be configured to cause opening of the jaw as the box slides forward across the top of the crossbars. Once the jaw encompasses the crossbar, it springs back to a secure closed position. The jaw is further configured so that it cannot be opened without a manipulation, for example, switch or lever-operated, action inside the box. This type of fastener may be referred to as "seat belt type engagement."

A jaw member as described above, may have different shapes. For example, the jaw member may be generically shaped to fit around differently shaped or dimensioned crossbars. Alternatively, the jaw member may be custom-shaped to fit around a specific crossbar configuration. For example, the jaw member may have a partially rectangular inner surface for fitting around a rectangular or square cross bar.

Clamping devices should be designed to minimize manufacturing costs and complexity. For example, a rail with a slot, as described above, may be molded into the floor of a box. A stationary jaw portion, movable jaw portion, and cam lever may be separately molded pieces.

Different kinds of actuators may be used to operate the jaw assembly. For example, an actuator may be a differently-shaped cam, or may be a screw mechanism using a threaded member. A cam lever may operate in different directions other than parallel to the long axis of a container as described above. Clamp mechanisms, as described above, may also be implemented to connect other types of apparatus to crossbars on top of a vehicle.

The clamp mechanisms shown and described herein may be implemented on boxes with any type of hinge and/or latch mechanism. For example, the clamping devices may be used on a box with dual functioning hinges that can operate as a hinge or a latch, for example, as described in U.S. Pat. No. 5,823,411 and U.S. Provisional Patent Application No. 60/443,437, each of which is hereby incorporated by reference in its entirety.

Figure 10:
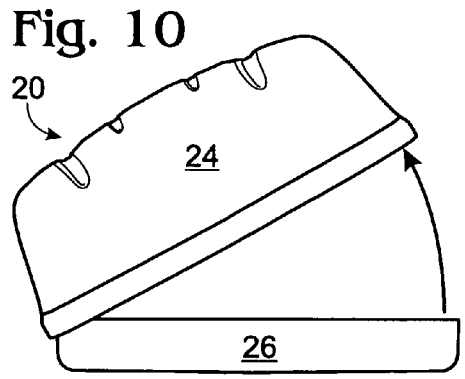
FIGS. 10 and 11 are end views of a car top carrier showing opening of the box from opposing sides.
Figure 11:
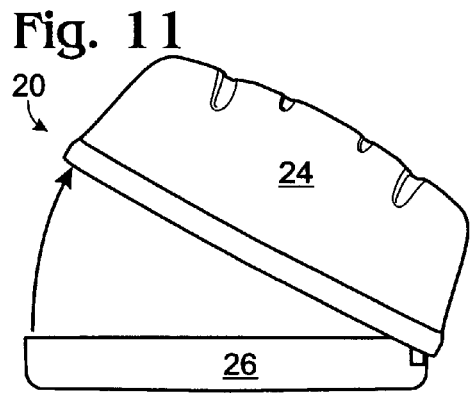

FIGS. 10 and 11 show end views of car top carrier 20 opened alternately from opposite sides. This feature of carrier 20 is made possible by dual-functioning hinge/latch mechanisms such as the examples described in detail below.

Figure 13:
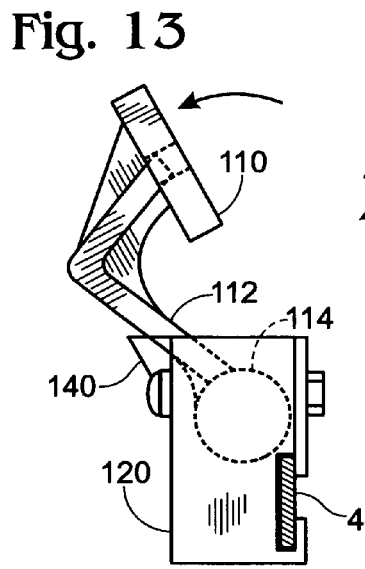
FIGS. 12-14 are side views of a hinge/latch mechanism, for example, as shown in FIG. 2.
Figure 12:
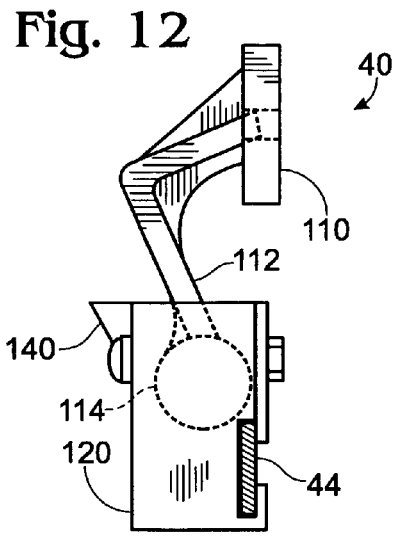
Figure 14:
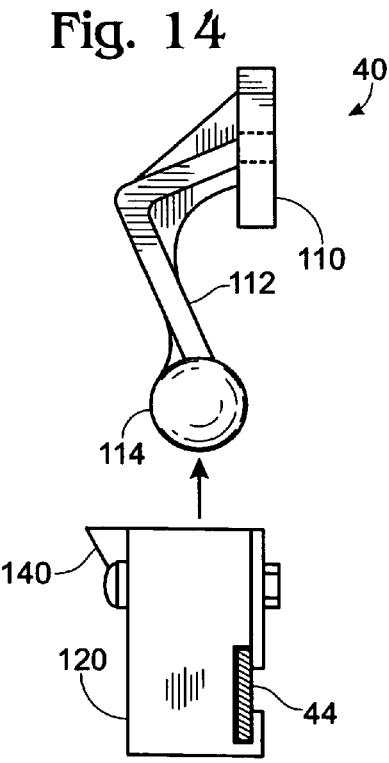

FIGS. 12 and 13 are side views of a hinge/latch mechanism, for example, like 40a-c and 42a-c in FIG. 2. Mounting base, platform, or portion 110 may be securely fastened, for example, by screws to 24 of carrier 20. Receiving portion 120 may be fastened securely to a corresponding location on bottom 26 of carrier 20. In FIG. 12 hinge/latch mechanism 40a is oriented in position for securing top 32 to bottom 34 when carrier 20 is closed. FIG. 13 shows the orientation of hinge/latch mechanism 40 when the hinge/latch mechanisms on the opposite side of the box are functioning as a latch. Flared portion 140 of receiving portion 120 permits a selected degree of motion of arm portion 112 relative to receiving portion 120. FIG. 14 shows hinge/latch mechanism 40 operating as a latch after enlarged end portion 114 has been released from receiving portion 120.

FIG. 15 shows a cut-away view of hinge/latch mechanism 40 with actuating bar 44 removed. Plunger 150 is spring-biased upward against enlarged end portion 114. The spring helps the lid to pop up initially when opening the container. As shown, enlarged end portion 114 has a spherical shape which allows mounting platform 110 multiple, even infinite, degrees of movement relative to receiving portion 120. This feature allows the hinge/latch device, not only the flexibility of acting as a hinge or a latch, but also permits the same hinge/latch configuration to be used on carriers of many different shapes and geometries. When pawl 122 is rotated in the direction of arrow 152 and is sufficiently out of the way of enlarged end portion 114, plunger 150 urges enlarged end portion 114 upward so that it disengages from receiving portion 120 even when pawl 122 is permitted to rotate back to its original orientation. The spring and plunger mechanism makes it easier to open the carrier because once the actuating bar has simultaneously pushed multiple pawl members out of the way in each of the coordinated hinge/latch mechanisms, the latches are disengaged without further manual movement or handling relative to carrier top 24. To re-engage hinge/latch mechanism 40a, enlarged end portion 114 is forced into receiving portion 120 until pawl 122 is pushed aside allowing enlarged end portion 114 to "snap" into place, as shown in FIG. 15. The springs may be selected such that very little, if any, manual force is required, in addition to gravity, to latch the top closed, somewhat analogous to the closing of a trunk on a car.

FIGS. 16-18 show movement of actuating bar 44 to disengage enlarged end portion 114 from receiving portion 120. As shown in FIG. 16, actuating bar 44 has a projection 160 that is normally spaced away from end portion 162 of pawl member 122 when hinge/latch mechanism 40a is functioning as a hinge. When actuating bar 144 is moved in the direction of arrow 164 in FIG. 17, projection 160 of actuating bar 144 contacts and pushes end portion 162 of pawl member 122. This eventually causes rotation of pawl member 122 out of the way of the main receiving channel in receiving portion 120, thus allowing enlarged end portion 114 to disengage receiving portion 120, enabling hinge/latch mechanism 40a to function as a latch.

Figure 19:
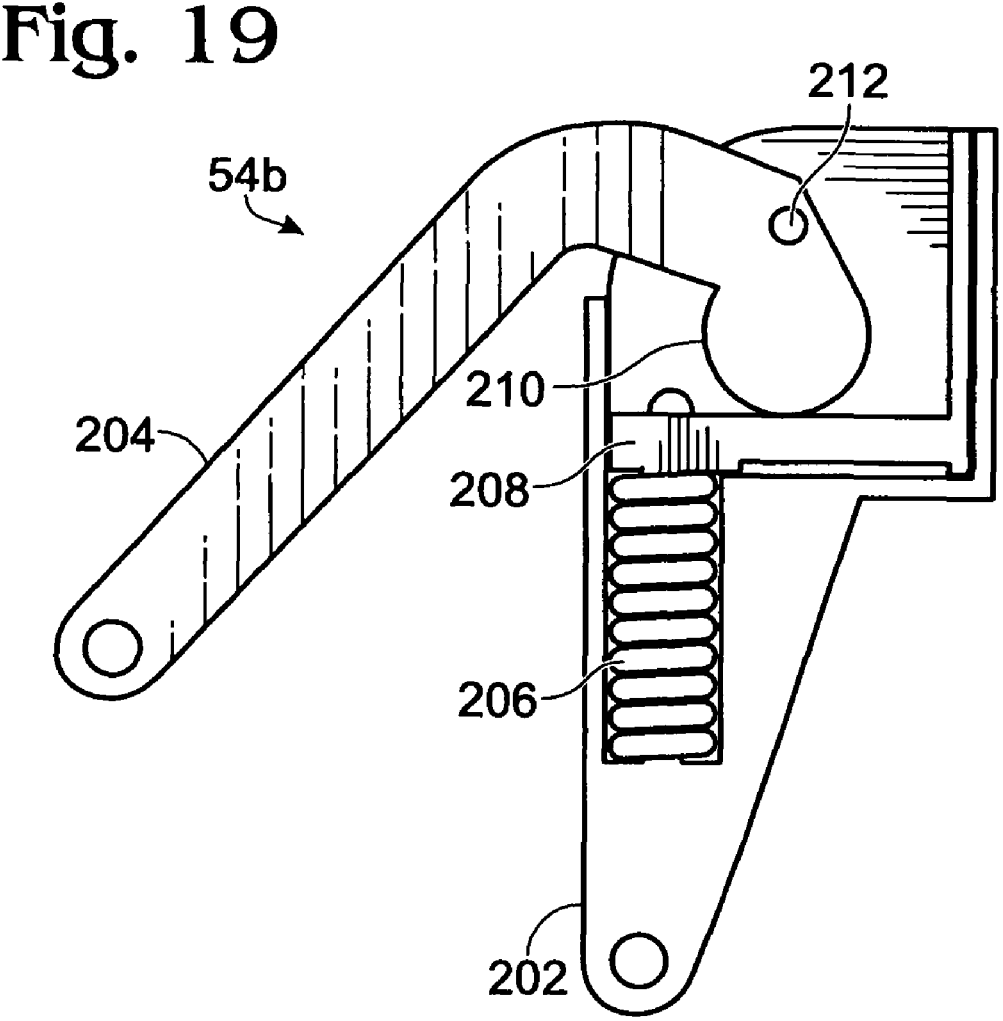
FIG. 19 is an isolated side view of a lid support device, for example, as shown in FIG. 2.

FIG. 19 shows a lid support, for example, such as 54b in FIG. 2. First arm 202 may be connected to bottom 26 of carrier 20. Second arm 204 may be connected to top 24 of carrier 20. First arm 202 is pivotally connected second arm 204. Spring 206 is contained in a pocket in first arm 202. Spring 206 acts on slide or cam follower 208 which moves up and down as second arm 204 is moved between open and closed positions. Second arm 204 has a cam portion 210 than contacts slide 208. The shape of cam portion 206 determines the magnitude and direction of torque exerted on second arm 204 about pivot point 212.

While the present invention has been particularly shown and described with reference to the foregoing preferred embodiments, those skilled in the art will understand that many variations may be made therein without departing from the spirit and scope of the invention as variously described and defined above. The description of the invention should be understood to include all novel and non-obvious combinations of elements described herein.

We claim:

1. A car top carrier comprising
a box having opposing lateral sides, a top, a bottom, a front end, and a rear end, the bottom having a floor, the floor having an inner surface and an outer surface, the top and the bottom being connected via a hinge mechanism,
strut members connecting the top to the bottom on the front and rear ends of the box to assist in holding the box open,
a plurality of preassembled clamp devices mounted to the floor configured to secure the box to a pair of crossbars on top of a vehicle, each clamp device including first and second jaw portions moveable relative to each other and from the outer surface of the floor defining a curved opening for receiving a crossbar, each clamp device further including a corresponding tightening mechanism mounted on the inner surface of the floor for controlling movement of corresponding jaw portions relative to each other on the outer surface of the floor between open and closed positions, the tightening mechanism including a threaded member connected to a screwable handle located inside the box, screwing rotation of the handle causing adjustment of the opening between the jaw portion.

2. The carrier of claim 1, wherein the tightening mechanism includes a threaded shaft portion.

3. The carrier of claim 2, wherein the screwable handle is connected to the threaded shaft connected to a handle, rotation of the handle causing movement of the jaw portion relative to each other between open and closed positions.

4. The carrier of claim 1, wherein the tightening mechanism includes a cam lever, pivotal movement of the cam lever causing relative movement of the jaw portions between open and closed positions.

5. The carrier of claim 1, wherein the first jaw portion is moveable relative to the floor.

6. The carrier of claim 1, wherein the second jaw portion is fixed relative to the floor.

7. The carrier of claim 1, wherein the first and second jaw portions extend from the outer surface of the floor defining a curved opening for receiving a crossbar.

* * * * *